United States Patent [19]
Williams et al.

[11] Patent Number: 5,122,656
[45] Date of Patent: Jun. 16, 1992

[54] FIBER OPTIC INPUT DEVICE HAVING A LIGHT TRANSMISSIVE BODY WITH PARALLEL GROOVES

[75] Inventors: Rodney D. Williams, Dallas; John Slaughter, Richardson; Felix Garcia, Jr., Roundrock, all of Tex.

[73] Assignee: Texas Instruments Incorporated, Dallas, Tex.

[21] Appl. No.: 626,939

[22] Filed: Dec. 13, 1990

[51] Int. Cl.⁵ .............................................. H01J 5/16
[52] U.S. Cl. .......................... 250/227.11; 250/227.31; 385/116
[58] Field of Search ...................... 250/227.11, 227.24, 250/227.30, 227.20, 227.21, 227.31, 227.28, 227.14; 350/96.24, 96.27, 96.25, 96.10

[56] References Cited
U.S. PATENT DOCUMENTS

| | | | |
|---|---|---|---|
| 4,320,292 | 3/1982 | Oikawa et al. | 250/227.11 |
| 4,812,647 | 3/1989 | Broussoux et al. | 250/227.11 |
| 4,911,527 | 3/1990 | Garcia, Jr. et al. | 250/227.14 |

Primary Examiner—David C. Nelms
Assistant Examiner—John R. Lee
Attorney, Agent, or Firm—Richard L. Donaldson; William E. Hiller; L. Joy Griebenow

[57] ABSTRACT

A sensor which comprises a light transmitting body having first and second opposing surfaces, the first surface having a first plurality of parallel grooves therein and wall members spacing the first grooves from each other, the second surface having a second plurality of parallel grooves therein extending in a direction substantially perpendicular to the first grooves, each of the second grooves optically coupled to one of the wall members, a first array of photoresponsive devices disposed at one end portion of the first grooves, the first array having a photoresponsive device associated with each groove of the first grooves and a second array of photoresponsive devices disposed at one end portion of the second grooves, the second array having photoresponsive device associated with each groove of the second grooves.

21 Claims, 1 Drawing Sheet

FIBER OPTIC INPUT DEVICE HAVING A LIGHT TRANSMISSIVE BODY WITH PARALLEL GROOVES

BACKGROUND OF THE INVENTION

1. Field of the Invention

This invention relates to an optical input device for a digital computer or terminal and, more specifically to an input device formed of optical fibers and/or light wave guides which receives an input light beam and indicates the position of the light beam thereon in two or three dimensions.

2. Brief Description of the Prior Art

Fiber optic input devices for use in conjunction with digital computers or terminals are known in the prior art. A typical example thereof is shown in U.S. Pat. No. 4,911,527 of Felix Garcia, Jr. et al. which is incorporated herein by reference, wherein a fiber optic device receives a light beam from a movable light source relative to the input device to provide input signals to a terminal. The device includes a single plane of parallel, clad optical fibers forming columns of a matrix and another similar single plane of parallel, clad optical fibers forming rows of a matrix, the two planes being placed together to form the matrix. The cladding is removed from the top surface of each fiber to form a window therein to permit the light beam to directly contact the selected window in the column plane and to permit the light beam that passes the column plane optical fibers to enter the window of the row plane. Light sensors are connected to the ends of the optical fibers in both the column and row planes so that a first signal is generated indicating a column position and a second signal is generated indicating a row position, thereby fixing the intersection of the column and row optical fibers at the point where the light beam impinges. At least one more similar single vertical position plane may be positioned adjacent and below the row plane. This vertical position plane has at least one light detector connected to the ends of the optical fibers and provides a signal responsive to the light beam that passes the column and row planes indicative of the vertical position of the light source with respect to the input device.

A further prior art fiber optic input device is set forth in Ser. No. 07/457,439, filed Dec. 27, 1989 of Felix Garcia, Jr. et al. for Device For Three Dimensional Tracking Of An Object, the contents of which are incorporated herein by reference. This application discloses a device for tracking an object in three dimensional space having a fiber optic sensor array which includes a row plane and a column plane, each plane having a plurality of parallel optical fibers bonded together. A row detector is coupled to the ends of the fibers comprising the row plane and a column detector is coupled to the ends of the fibers comprising the column plane, the row and column detectors being coupled to a decoder circuit. A pair of beam generators are affixed to the object and are each operable to transmit beams which terminate on the fiber optic sensor array. By determining the points of incidence of beams, the decoder circuit determines the position of the object in three dimensional space.

In each of these devices, a system of optical sensors is required to be secured to the optical fibers to provide appropriate readouts therefrom.

SUMMARY OF THE INVENTION

In accordance with the present invention, the above noted prior art is improved by providing a holder for the optical path, preferably a fiber optic device or a light wave guide, which also operates as the sensor and provides communication between x and y determining optical paths.

Briefly, in accordance with one embodiment of the invention, there is provided a light transmissive body, such as polymethylmethacrylate or a semiconductor material such as gallium arsenide, having a first plurality of parallel grooves formed, such as by etching, on a top surface thereof and a second plurality of parallel grooves formed, such as by etching, on an opposing bottom surface thereof, the top and bottom surfaces preferably being parallel to each other. The first plurality of grooves extends in a direction substantially perpendicular to the direction of the second plurality of grooves and is spaced therefrom by the thickness of the body. If the body is of semiconductor material, it will be sufficiently thin to permit light to pass from the upper surface thereof to the grooves in the opposing surface. Fiber optic elements are disposed in each of the grooves on both surfaces. A separate phototransistor which provides an output signal in response to the impingement of light thereon is preferably disposed at the terminus or both termini of each groove and can be formed in the body itself when the body is of semiconductor material.

The cladding on the top portion of each of the fiber optic elements on the top surface of the chip is removed so that light external of the sensor which impinges upon any of these fiber optic elements will travel along that fiber optic element to a phototransistor at one or both termini of that fiber optic element. The grooves are spaced apart and include intervening wall members which are light transmissive and transmit light impinging thereon to the grooves on the opposing face of the body. In addition, the thickness of the body between the two opposed surfaces is such that light impinging upon a wall member on the top surface will also pass through to an aligned groove disposed on the bottom surface of the body and travel along a fiber optic element in the groove to a phototransistor associated with the groove on the bottom surface.

A light beam in space which strikes one of the fiber optic elements on the top surface will be wide enough to also strike the wall adjacent the fiber optic element and will travel along that element to an associated phototransistor. This light will also travel through the wall of the body to the fiber optic element directly therebelow in the bottom surface and travel along that element to an associated phototransistor. In this way, the two dimensional location of a light beam in space can determined.

In accordance with a second embodiment of the invention, the fiber optic elements are replaced by molded optical wave guides, preferably having light reflecting interior surfaces. The second embodiment operates in exactly the same manner as the first embodiment except that the light passes along the wave guide itself rather than along the fiber optic element.

In accordance with a third embodiment, the phototransistors are replaced by charge coupled devices (CCDs).

As a fourth embodiment of the invention, a photoresponsive device of the above noted types is placed at only one terminus of each fiber optic element or wave guide with a mirror placed at the other fiber optic element terminus to maximize the amount of light impinging upon the photoresponsive device.

DESCRIPTION OF THE PREFERRED EMBODIMENT

Figure 1:
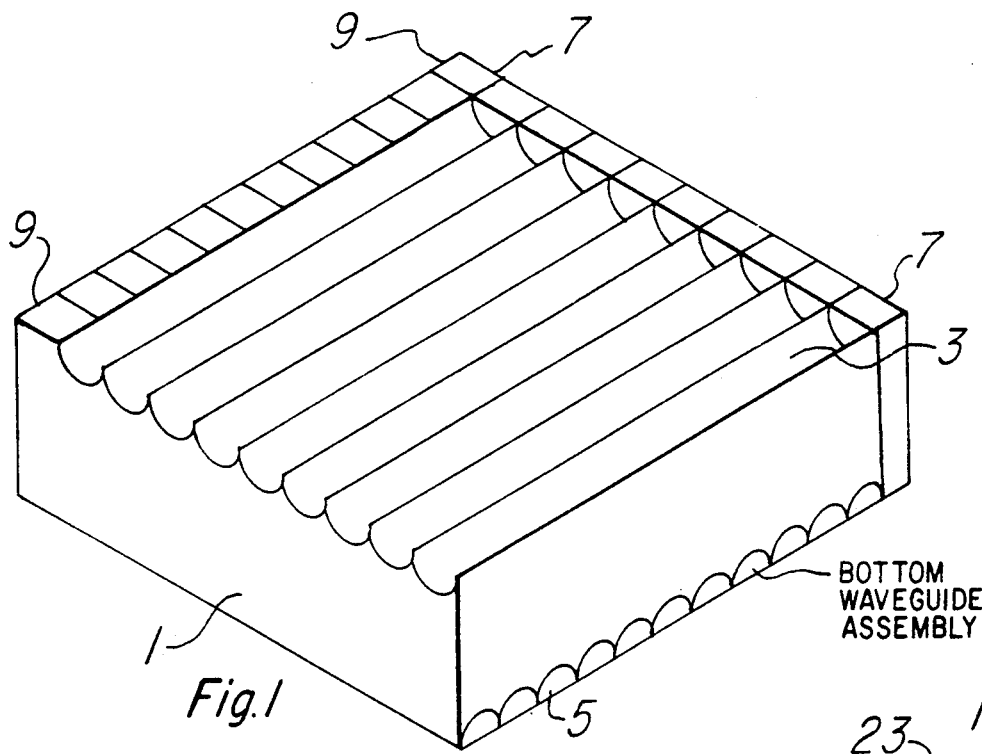
FIG. 1 is a perspective view of an etched body having grooves thereon for receiving fiber optic elements therein or for transmitting light along the grooves themselves and phototransistors at a terminus of each groove in accordance with the present invention.

Referring first to FIG. 1, there is shown a perspective view of a waveguide and detector assembly body 1 which can be used in conjunction with fiber optic elements or as a waveguide per se or portion thereof. The body 1 is formed of semiconductor material, preferably of a material from which phototransistors can be fabricated, such as, for example, a group III-V compound such as gallium arsenide or from a light transmitting material, preferably polymethylmethacrylate. The chip includes on the top surface thereof a plurality of parallel grooves 3 and on the bottom surface thereof a plurality of parallel grooves 5, the grooves 3 extending in a direction substantially perpendicular to the direction of the grooves 5. The thickness of the body 1 is such that the light impinging thereon will pass therethrough to the grooves 5. Also formed in the body 1 if it is formed of appropriate semiconductor material are a plurality of phototransistors in a first array 7 aligned with each of the grooves 3 and in a second array 9 aligned with each of the grooves 5. If the body 1 is not capable of having phototransistors formed therein, then phototransitors will be aligned with at least one terminus of each of the grooves 3 and 5 and secured to the body.

Figure 2:
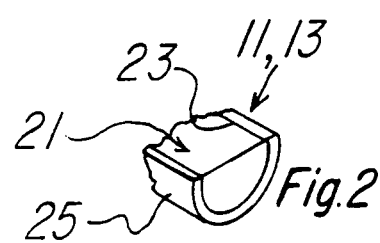
FIG. 2 is an elevational view of a fiber optic element with a portion of the cladding removed therefrom which can be placed in the grooves of FIG. 1 in accordance with the present invention.
Figure 3:
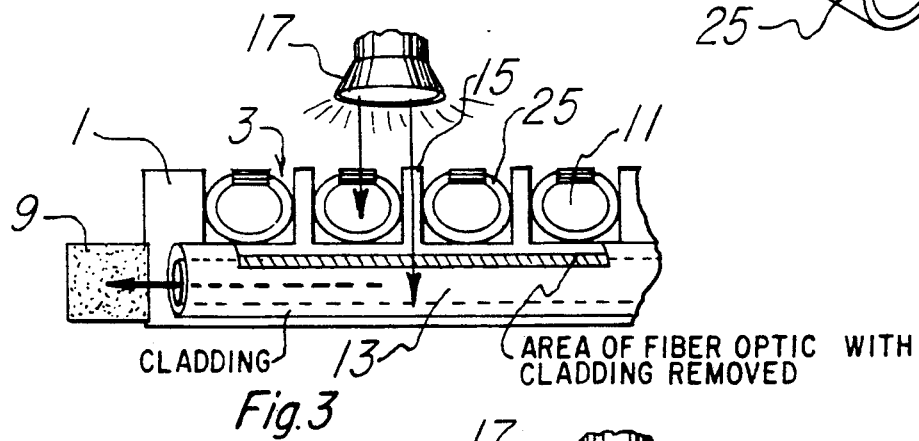
FIG. 3 is a cross-sectional view of a complete sensing device in accordance with a first embodiment of the present invention.

In accordance with a first preferred embodiment of the invention, as set forth in FIG. 3, there is shown the body 1 as in FIG. 1 which is formed of transparent material, preferably polymethylmethacrylate having grooves 5 and 7. Fiber optic elements 11 are disposed in each of the grooves 3 and each element 11 extends to an associated phototransistor 7 (not shown in FIGURE 3). Fiber optic elements 13 are disposed in each of the grooves 5 and each element 13 extends to an associated phototransistor detector 9. Each of the fiber optic elements 11 in the grooves 3, as shown in FIG. 2, includes cladding 25 and a light conducting portion 23 therein, the cladding being removed from the upper portion 21 of the device 11. The light conducting portion 23 at the upper portion 21 is thereby exposed and light impinging thereon from light beam 17 will travel along the conducting portion 23 to the phototransistor 7 associated therewith. This light travel along the light conducting portion 23 will take place regardless of the angle of impingement of the light from light beam 17 on the light conducting portion due to light scattering.

The cladding is also removed from the fiber optic elements 13 in the same manner as shown for the fiber optic elements 11 in FIG. 2A. The exposed upper portion 21 is positioned against the associated groove 5 so that light travelling from a light beam 17 through the wall 15 in the body 1 will impinge on the fiber optic element 13 thereunder with this light travelling to the phototransistor 9 associated therewith. It is understood that the width of the light beam 17 is such that it will contact only one fiber optic element 11 and only one of the walls 17. In this way, the location of the external impinging light beam 17 is located in two dimensions. It should be noted that a phototransistor can be disposed at each end of each groove 3 and/or 5.

Figure 4:
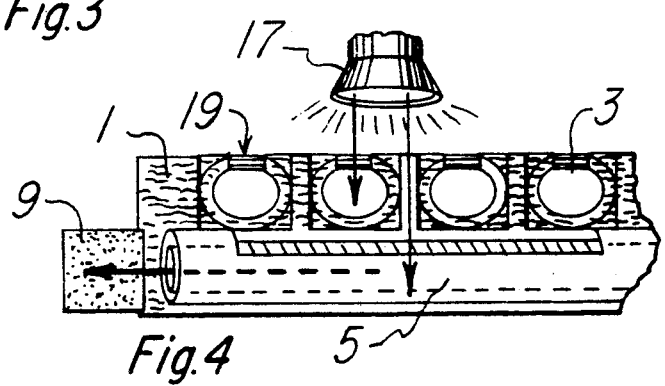
FIG. 4 is a cross-sectional view of a complete sensing device in accordance with a second embodiment of the present invention.

In accordance with a second embodiment of the invention, the grooves 3 and 5 as shown in FIG. 1 operate as optical wave guides. In this embodiment, as shown in FIG. 4, the body 1 is preferably formed of polymethylmethacrylate and the grooves 3 and 5 are circular in shape with a small opening 19 therein at the upper surface of the body to permit light striking a groove 3 to travel along the groove to the phototransistor 3 associated with that groove. The light will also travel through the material of body 1 to a groove 5 and travel therealong to the phototransistor 5 associated with that groove.

In order to maintain maximum light in the grooves 3 and 5, the interiors of these grooves are preferably coated with a light reflective coating and the openings 19 of the grooves 3 and 5 can have a half silver mirror thereat to allow light impinging thereon to pass into the groove but not to be reflected out of the groove. This function can also be accomplished by leaving a small amount of cladding at the openings 19.

In accordance with a third embodiment of the invention, each of the phototransistors in the arrays 7 and 9 are replaced by charge coupled devices (CCDs).

In accordance with a fourth embodiment of the invention, a phototransistor or CCD is provided at one end of each of the grooves 3 and 5 and a mirror is placed at the opposite end of each of the grooves. In this way, a maximum of light will ultimately be directed to a single photoresponsive device of each array 7 and 9.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim:
1. A sensor which comprises, in combination:
   (a) a light transmitting body having first and second opposing surfaces, said first surface having a first plurality of parallel grooves therein and wall members spacing said first grooves from each other, said second surface having a second plurality of parallel grooves therein extending in a direction substantially perpendicular to said first grooves, each of said second grooves optically coupled to one of said wall members;
   (b) a first array of photoresponsive devices disposed at one end portion of said first grooves, said first array having a photoresponsive device associated with each groove of said first grooves; and
   (c) a second array of photoresponsive devices disposed at one end portion of said second grooves, said second array having photoresponsive device associated with each groove of said second grooves.

2. A sensor as set forth in claim 1 wherein said body is a group III-V semiconductor material.

3. A sensor as set forth in claim 1 wherein said photoresponsive devices are phototransistors.

4. A sensor as set forth in claim 2 wherein said photoresponsive devices are phototransistors.

5. A sensor as set forth in claim 1 wherein said photoresponsive devices are charge coupled devices.

6. A sensor as set forth in claim 2 wherein said photoresponsive devices are charge coupled devices.

7. A sensor as set forth in claim 1, further including a clad fiber optic device disposed in each of said first and second grooves, the cladding of said fiber optic devices on a portion of the surface thereof facing said first surface being removed.

8. A sensor as set forth in claim 2, further including a clad fiber optic device disposed in each of said first and second grooves, the cladding of said fiber optic devices on a portion of the surface thereof facing said first surface being removed.

9. A sensor as set forth in claim 3 further including a clad fiber optic device disposed in each of said first and second grooves, the cladding of said fiber optic devices on a portion of the surface thereof facing said first surface being removed.

10. A sensor as set forth in claim 4, further including a clad fiber optic device disposed in each of said first and second grooves, the cladding of said fiber optic devices on a portion of the surface thereof facing said first surface being removed.

11. A sensor as set forth in claim 5, further including a clad fiber optic device disposed in each of said first and second grooves, the cladding of said fiber optic devices on a portion of the surface thereof facing said first surface being removed.

12. A sensor as set forth in claim 6, further including a clad fiber optic device disposed in each of said first and second grooves, the cladding of said fiber optic devices on a portion of the surface thereof facing said first surface being removed.

13. A sensor as set forth in claim 1 further including a third array of photoresponsive devices disposed at the end portion of said first grooves opposite said first array, said third array having a photoresponsive device associated with each groove of said first grooves and a fourth array of photoresponsive devices disposed at the end portion of said second grooves opposite said second array, said fourth array having photoresponsive device associated with each groove of said second grooves.

14. A sensor as set forth in claim 1 further including first reflecting means disposed at the end portion of said first grooves opposite said first array to reflect light impinging thereon toward said first array and second reflecting means disposed at the end portion of said second grooves opposite said second array to reflect light impinging thereon toward said second array.

15. A sensor as set forth in claim 1 wherein said body is polymethylmethacrylate.

16. A sensor as set forth in claim 1 wherein the surfaces of said grooves comprise a light reflecting coating having greater light reflectivity than said body.

17. A sensor as set forth in claim 2 wherein the surfaces of said grooves comprise a light reflecting coating having greater light reflectivity than said body.

18. A sensor as set forth in claim 1 further including a half silver mirror disposed at the entrance to each of said first plurality of parallel grooves.

19. A sensor as set forth in claim 15 further including a half silver mirror disposed at the entrance to each of said first plurality of parallel grooves.

20. A sensor as set forth in claim 16 further including a half silver mirror disposed at the entrance to each of said first plurality of parallel grooves.

21. A sensor as set forth in claim 17 further including a half silver mirror disposed at the entrance to each of said first plurality of parallel grooves.

* * * * *